United States Patent [19]

Zerlik

[11] 4,420,198
[45] Dec. 13, 1983

[54] ELECTRICAL CONNECTION
[75] Inventor: Willibald Zerlik, Birr, Switzerland
[73] Assignee: BBC Brown, Boveri & Company, Limited, Baden, Switzerland
[21] Appl. No.: 277,239
[22] Filed: Jun. 25, 1981
[30] Foreign Application Priority Data Jul. 4, 1980 [EP] European Pat. Off. ........ 80200649.4

[51] Int. Cl.³ ...................... H01R 39/08; H01R 39/24
[52] U.S. Cl. .................................... 339/5 R; 310/61; 339/8 R
[58] Field of Search ............. 339/5, 258 A, 8 R, 8 A; 310/61, 232

[56] References Cited

U.S. PATENT DOCUMENTS 3,733,502  5/1973  Curtis et al. ........................ 310/61
4,267,475  5/1981  Vitchenko et al. ............... 310/61 X

FOREIGN PATENT DOCUMENTS 948398  2/1964  United Kingdom .

OTHER PUBLICATIONS

"Technische Rundschau" (technical view), 1975, Nos. 26 and 43 (appearing in the MC Contact Lamination Principle.

*Primary Examiner*—Eugene F. Desmond
*Attorney, Agent, or Firm*—Oblon, Fisher, Spivak, McClelland & Maier

[57] ABSTRACT

An electrical connection for an electrical machine having a slip ring bolt mounted with axial play in a radial shaft borehole and a suitable electrical connecting link between a slip ring and the slip ring bolt is provided, wherein the slip ring is mechanically disconnected from a rotor shaft. In one embodiment of the electrical connecting link, a contact carrier is rigidly connected with the slip ring bolt and which penetrates into an annulus formed in a slip ring on the side of the slip ring bolt. A contact lamination tape is placed into an annular slot formed in the contact carrier, which effects electrical connection between the contact carrier and the slip ring. In a second embodiment, a contact ring is provided at the end of the slip ring on the side of the slip ring bolt, which is connected with a slip ring bolt through a strap of copper-stranded wire.

2 Claims, 6 Drawing Figures

ELECTRICAL CONNECTION

BACKGROUND OF THE INVENTION

1. Field of the Invention

The invention refers to an electrical connection between contact rails arranged in an axial shaft borehole and the slip ring of an electrical machine including a slip ring bolt, rigidly connected with the contact rail, which is arranged with axial play in a radial shaft borehole and whose radial outer end is connected with the slip ring through an electrical connecting link.

2. Description of the Prior Art

A slip ring supply line includes two copper rails with a semi-circular cross-section which are installed in an axially running shaft borehole. The two supply rails are, on the one hand, connected at their ends with the winding through supply bolts and, on the other hand, with the slip rings through slip ring bolts and contact links. In general, the slip ring bolts and supply bolts are rigidly held in the respective radial shaft boreholes. During operation of the machine, an axial force can be exerted on the shaft so as to bend the same, resulting from different expansions in length of the two supply rails and of the shaft. Bending of the shaft leads then to increased uneven running of the entire turbo-system.

The above given facts have been taken into account in an electrical machine with liquid-cooled rotor according to the U.S. Pat. No. 3,733,502, as the slip ring bolt as well as the supply bolt have been arranged therein in their radial shaft boreholes with axial play. Relative movement is made possible between the supply bolt and the rotor shaft or rotor coil end without causing damage to the parts to be connected with each other, by means of suitably guiding the connecting line between the supply bolt and the rotor coil end. No details can be derived from the above-mentioned U.S. Patent concerning the connection between the slip ring bolt and the slip rings.

SUMMARY OF THE INVENTION

The object of the present invention is to provide a connection arrangement of the kind mentioned in the introduction whereby the slip ring is mechanically disconnected from the slip ring bolt but is in a position to reliably guide high current occurring during operation.

The accomplishment of the object is effected according to the invention, on the one hand, by the fact that the electrical connecting link includes a ring-shaped contact carrier, surrounding the rotor shaft and rigidly connected with the slip ring bolt, which penetrates into an annulus at the slip ring end on the slip ring bolt side or surrounds this end by placing it between a contact lamination tape, which is also ring-shaped and that the surfaces of the slip ring end on the slip ring bolt side and of the contact carrier, interacting with the contact lamination tape, are designed as contact surfaces and, on the other hand, according to the invention, the slip ring end on the slip ring bolt side is rigidly connected with a contact ring, and a flexible tape of a highly conductive material is arranged between the contact ring and the slip ring bolt which is, at least partially, secured against the effect of the centrifugal force by means of a cover.

The connection arrangement according to the invention is particularly provided for gas-cooled rotors since, in these cases, comparatively high temperature differences can occur between the rotor shaft and the contact rails.

In the case of a first embodiment, the ring-shaped contact lamination tape ensures a large-area current transfer and permits at the same time axial movement between the contact carrier rigidly connected with the slip ring bolt and the slip ring. Thus, no inadmissible axial forces are exerted on the shaft in connection with the axial play permitting guide of the slip ring bolt in the rotor shaft. The axial length of the contact surfaces interacting with the contact lamination tape and the length of the contact lamination tape itself can be selected in such a manner that no danger of jamming occurs even with maximum relative movement.

In the case of a second embodiment, the mechanical disconnection between the slip ring and the slip ring bolt is effected by means of the flexible tape.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENT

Figure 1:
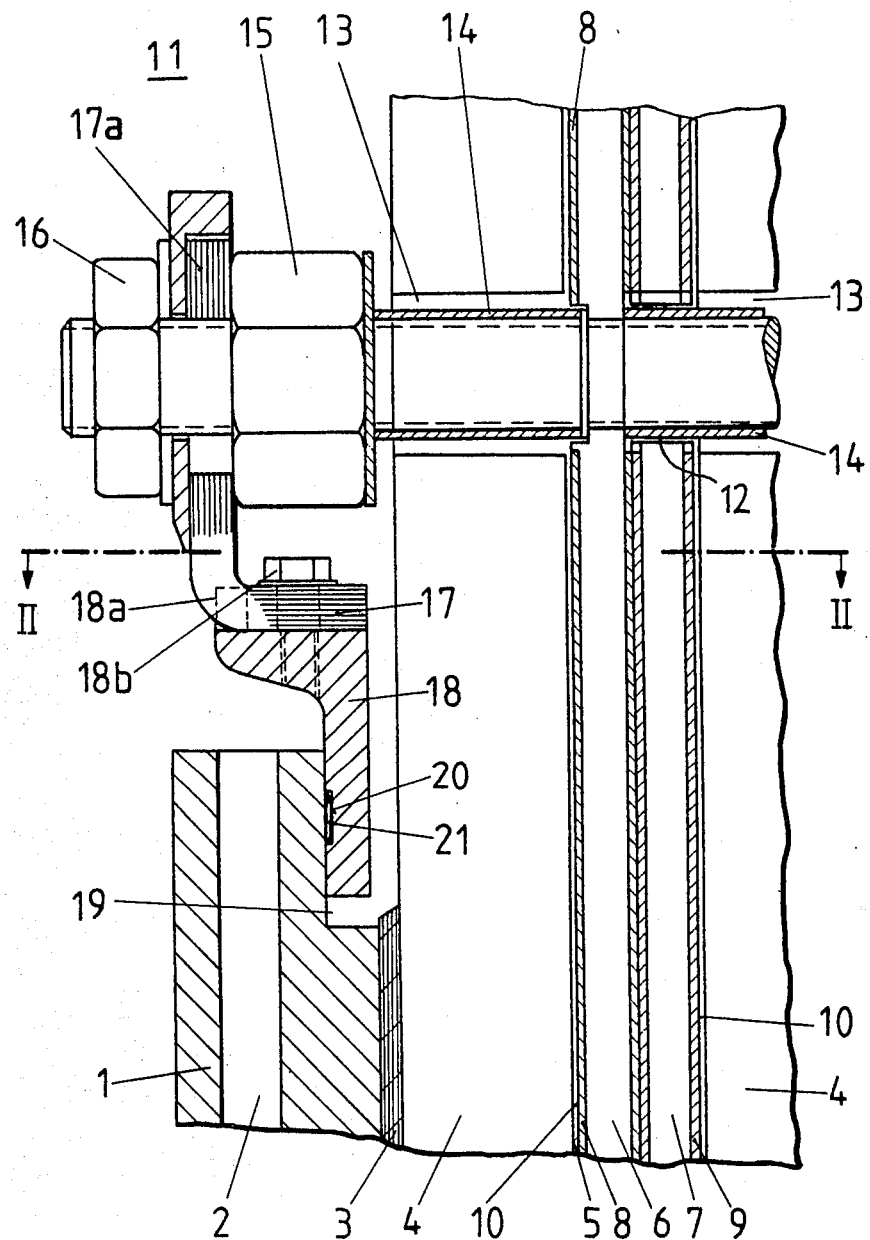
FIG. 1 illustrates a connection arrangement with a contact lamination tape used for the electrical connection between the slip ring and the slip ring bolt in a longitudinal cross-section constituting a first embodiment in accordance with the present invention.
Figure 2:
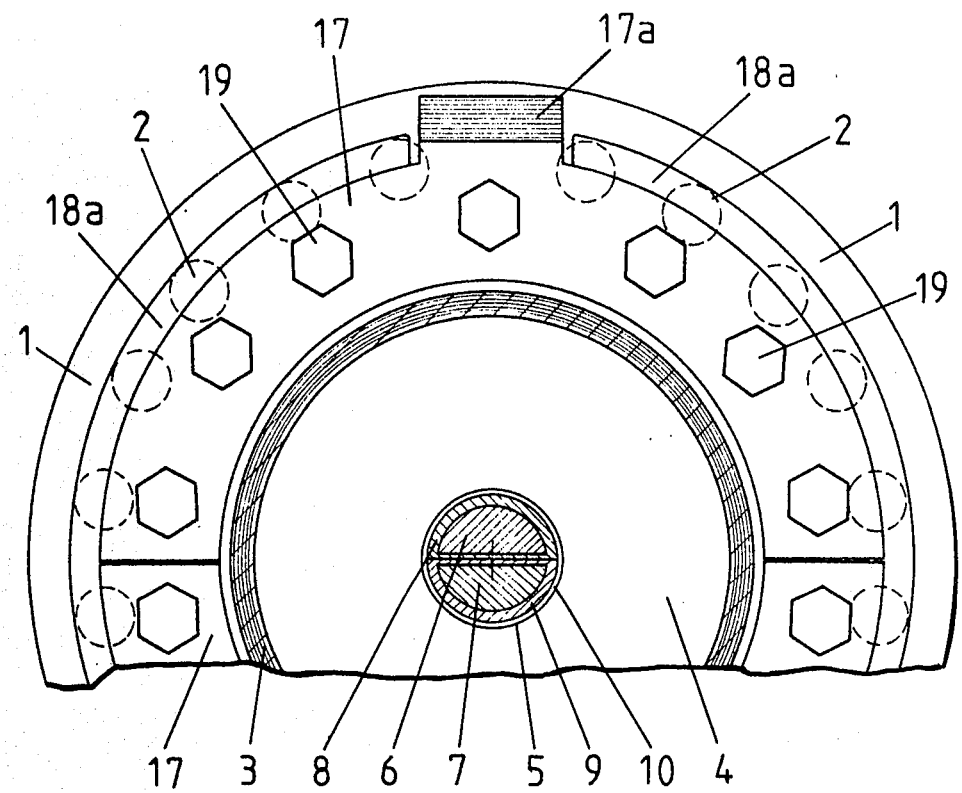
FIG. 2 shows a radial cross-section view through the embodiment according to FIG. 1 along line II—II.

In FIGS. 1 and 2, a slip ring 1 with axial cooling air boreholes 2 is shrink-fitted on a shaft 4 of an electrical machine by placing an insulation sheath 3 therebetween. Two contact rails 6, 7 with semi-circular cross-section are arranged in an axial borehole 5 of rotor shaft 4 which are insulated from each other and from the rotor shaft by means of insulating layer 8, 9. Ring-shaped gaps 10 are provided (drawn in exaggerated size in FIGS. 1 and 2) between contact rails 6, 7 and the wall of shaft borehole 5. Gaps 10 further permit relative movement between contact rails 6, 7 and shaft 4 without, however, permitting radial movement worth noting.

The electrical connection between slip ring 1 and contact rail 6 is effected by means of a slip ring bolt led diametrically through shaft 4 and generally designated by reference number 11. Bolt 11 is rigidly screwed to contact rail 6 in the center area and is led toward the outside through a radial borehole 12 in contact rail 7 and a diametrical borehole 13 of the rotor shaft 4. The part of bolt 11 located within borehole 13 is insulated vis-a-vis borehole 13 and especially also vis-a-vis contact rail 7 by means of insulation sheaths 14.

Diametrical shaft borehole 13 is designed as a slot-like borehole and thus axial relative movement of slip ring bolt 11 vis-a-vis rotor shaft 4, for example, in case of different heating between contact rails 6, 7 and rotor shaft 4. A nut 15 is shrink-fitted on the outer end of slip ring bolt 11 in the area close to shaft 4. A connecting bracket 17 is provided with an eye 17a fastened to both ends of slip ring bolt 11 by means of a second nut 16, connecting bracket 17 being, in turn, connected with a ring-shaped contact carrier 18 surrounding the rotor shaft 4 by means of screws 18b. As can be noticed from the radial cross-sectional view according to FIG. 2, both connecting brackets are designed and laminated in the same manner. The end of contact carrier 18 on slip ring bolt 11 side has a ring-shaped, nose-like projection 18a which secures the two connecting brackets 17 against the effect of centrifugal forces. The projection 18a is interrupted in the area of eyes 17a.

The end of the contact carrier 18 on slip ring side penetrates into a ring-shaped groove 19 of slip ring 1. The inner diameter of groove 19 corresponds approximately to the outer diameter of the above-mentioned contact carrier end. An annular slot 20 is provided in the center section of contact carrier 18 into which a ring-shaped contact lamination tape 21 is placed. This contact lamination tape consists of a beryllium bronze sheet strip whose ends are not connected with each other. This sheet strip is slotted in a louvre-like manner and the developing lamination cross-pieces are individually turned out of the level of the tape by about 40°. Further details of such contact lamination tapes are, for example, known from the magazine "Technische Rundschau" ("Technical Review") 1975, Nos. 26 and 43 in the write-up "The MC contact lamination principle". In order to avoid as much as possible jamming between contact carrier 18 and slip ring 1 or groove 19, the penetration depth of contact carrier 18 into groove 19 is of a correspondingly selected size. Additionally, the contact lamination tape 21 extends only across the center section of contact carrier 18 (relative to its penetrated portion). The axial length of annular slot 20 corresponds approximately to that of contact lamination tape 21 and amounts to between one third and one half of the penetration depth. In this manner, the actual guiding of contact carrier 18 in groove 19 is effected by means of the contact carrier outer circumference and the inner wall of the groove. Thus, contact lamination tape 21 must not serve as a guide but serves, therefore, only for the transfer of current. In order to obtain an optimum contact, annular slot 20 and the inner surface of groove 19 are additionally silver-plated.

Figure 3:
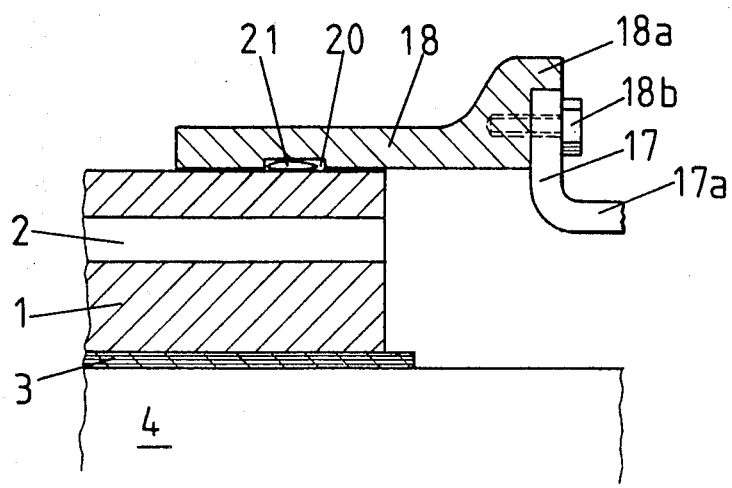
FIG. 3 is a schematic illustration showing a second embodiment, whereby contacting of the slip ring takes place at its outer circumference.

In the second embodiment shown in FIG. 3, ring-shaped contact carrier 18 surrounds the end of slip ring on the side of the bolt. In contrast to the embodiment shown in FIGS. 1 and 2, annular slot 20 is herein provided on the inner circumference of the contact carrier in order to receive contact lamination tape 21 which is also ring-shaped. Apart from the different design of the connecting brackets 17—their eyes 17a point towards the inside—the embodiment corresponds as to its remaining parts fully with that according to FIG. 1 and FIG. 2.

Figure 4:
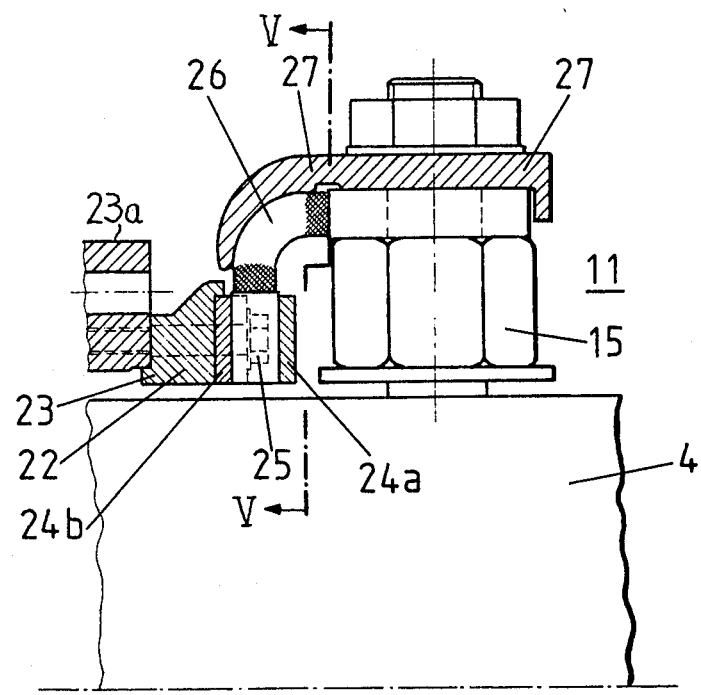
FIG. 4 shows a connection arrangement with a tape of copper stranded wire used for the electrical connection between the slip ring and the slip ring bolt in a longitudinal cross-section constituting a third embodiment of the present invention.

In the case of the third embodiment represented in FIG. 4 which corresponds with that of FIGS. 1, 2 and 3 with regard to the arrangement of slip ring 1, contact rails 6, 7 and slip ring bolt 11, the end of slip ring 1 on the side of slip ring bolt 11 is provided with a front-end intermediate ring 22 whereby a ring-shaped attachment 23 rests on the inner side of slip ring 1. A split contact ring 24 is fastened to the front surface of intermediate ring 22 on the side of bolt 11. An additional attachment 23a on the bolt-side end of intermediate ring 22 secures the contact ring halves against centrifugal forces. Intermediate ring 22 and the contact ring 24 are, in this instance, jointly screwed to slip ring 1 by means of a large number of screws 25 distributed over the circumference. The electrical connection between slip ring bolt 11 and contact ring 24 is effected by means of a highly flexible strap 26 of copper-stranded wire. In order to secure strap 26 against the effects of centrifugal forces, strap 26 is secured by means of a cover 27 which is fastened to slip ring bolt 11 together with the strap and is radially bent inwardly on the side of slip ring 11.

As can be noticed from the radial cross-section view according to FIG. 3, electrical connection is effected on a large area between strap 26 and contact ring 24. It can be recognized from the cross-section according to FIG. 4, the contact ring 24 is designed in two parts and consists of two split individual rings 24a and 24b placed on top of each other, which leaves a space therebetween in the area of fastening of strap 26. This embodiment permits the large-area connection of strap 26 with the contact ring, for example, by soldering.

Figure 6:
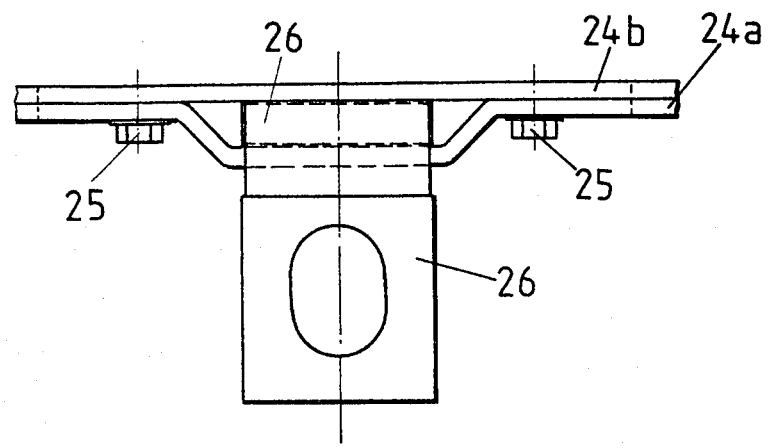
FIG. 6 is a cross-section view through the embodiment according to FIG. 5 along line VI—VI.
Figure 5:
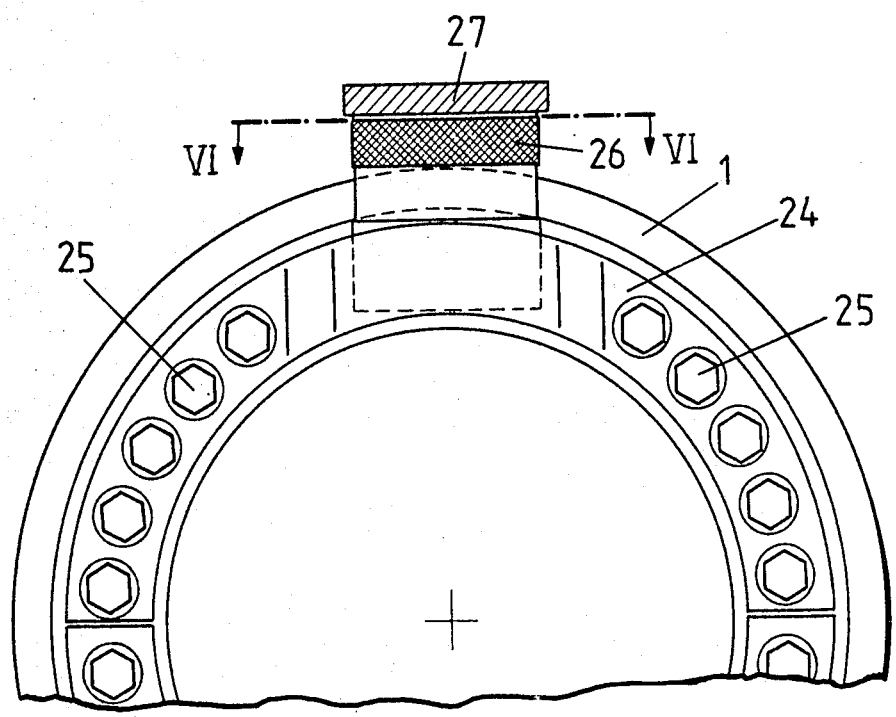
FIG. 5 is a radial cross-section view through the embodiment according to FIG. 4 along line V—V.

The invention is, of course, not limited to the embodiments shown in the drawings. Thus, instead of annular slots 20 in contact carrier 18 in the arrangement according to FIGS. 1, 2 and 3, these slots 20 can also be arranged in the corresponding section of the slip ring 1. In the case of the embodiment according to FIGS. 4 to 6, intermediate ring 22 can be eliminated whereby contact ring 24 would have to be fastened directly to the front surface on the bolt side of slip ring 1, preferably in a groove.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electrical connection for a electrical machine having a gas cooled rotor comprising:
   a slip ring;
   a first and second contact rail;
   a rotor shaft mounted in an axial shaft borehole formed in said electrical machine;
   a slip ring bolt mounted in a radial shaft borehole formed in said electrical machine so as to have axial play and connected at a first end thereof to at least one of said first and second contact rails; and
   an electrical connecting link interconnecting a second end of said slip ring bolt to said slip ring wherein said electrical connecting link comprises a ring-shape contact carrier surrounding said rotor shaft and rigidly connected to said slip ring bolt; and a contact lamination tape disposed between said slip ring and said contact carrier wherein said slip ring has an axially extending annulus formed therein, said contact carrier axially extending into said annulus of said slip ring, and said contact carrier having an annular slot formed therein to receive said contact lamination tape in a substantially center section portion of the end portion on the contact carrier which extends into said annulus, and wherein the outer circumference of an end portion of said contact carrier contacts the circumference of said annulus formed in said slip ring, and the axial dimension of said contact lamination tape is less than the axial dimension of the depth of the extension of said contact carrier into said annulus.

2. An electrical connection for an electrical machine having a gas cooled rotor comprising:
   a slip ring;
   a first and second contact rail;
   a rotor shaft mounted in an axial shaft borehole formed in said electrical machine;
   a slip ring bolt mounted in a radial shaft borehole formed in said electrical machine so as to have axial play and connected at a first end thereof to at least one of said first and second contact rails; and
   an electrical connecting link interconnecting a second end of said slip ring bolt to said slip ring wherein said electrical connecting link comprises a ring-shape contact carrier surrounding said rotor shaft and rigidly connected to said slip ring bolt; and a contact lamination tape disposed between said slip ring and said contact carrier wherein said slip ring has an axially extending annulus formed therein, said contact carrier axially extending into said annulus of said slip ring, and said contact carrier having an annular slot formed therein to receive said contact lamination tape in a substantially center section portion of the end portion on the contact carrier which extends into said annulus, the outer circumference of an end portion of said contact carrier contacting the circumference of said annulus formed in said slip ring, and the axial dimension of said contact lamination tape being less than the axial dimension of the depth of the extension of said contact carrier into said annulus and wherein the axial dimension of said contact lamination tape is in the range of one half to one third of the axial dimension of the depth of the extension of said contact carrier into said annulus.

* * * * *